(12) United States Patent
Kertscher

(10) Patent No.: US 8,475,617 B2
(45) Date of Patent: Jul. 2, 2013

(54) DEVICE FOR PRODUCTION OF DRIP IRRIGATION TUBES

(75) Inventor: Eberhard Kertscher, Yvonand (CH)

(73) Assignee: The Machines Yvonand SA, Yvonand (CH)

( * ) Notice: Subject to any disclaimer, the term of this patent is extended or adjusted under 35 U.S.C. 154(b) by 630 days.

(21) Appl. No.: 12/720,614

(22) Filed: Mar. 9, 2010

(65) Prior Publication Data
US 2011/0064836 A1 Mar. 17, 2011

(30) Foreign Application Priority Data
Mar. 10, 2009 (EP) .................................. 09154782

(51) Int. Cl.
B29C 47/02 (2006.01)

(52) U.S. Cl.
USPC ............ 156/244.13; 156/244.14; 156/244.19; 156/244.27; 156/500; 425/71; 425/114; 425/326.1

(58) Field of Classification Search
USPC ............. 425/71, 114, 131.1, 290, 308, 326.1, 425/388, 392; 156/244.11, 244.13, 244.14, 156/244.19, 244.27, 500
See application file for complete search history.

(56) References Cited

U.S. PATENT DOCUMENTS

| 4,254,916 | A |   | 3/1981  | Havens et al. |        |
|-----------|---|---|---------|---------------|--------|
| 5,022,940 | A | * | 6/1991  | Mehoudar ...................... | 156/64 |
| 5,271,786 | A | * | 12/1993 | Gorney et al. ................ | 156/229 |
| 5,324,371 | A |   | 6/1994  | Mehoudar      |        |
| 5,744,779 | A |   | 4/1998  | Buluschek     |        |
| 6,894,250 | B2 | * | 5/2005 | Kertscher ................. | 219/121.72 |
| 7,530,382 | B2 |   | 5/2009 | Kertscher et al. |     |
| 2003/0214083 | A1 |   | 11/2003 | Kelly et al. |      |
| 2006/0034965 | A1 | * | 2/2006 | Ulrich et al. ................... | 425/325 |

FOREIGN PATENT DOCUMENTS

| EP | 0 715 926 A1 | 6/1996 |
| EP | 1 403 025 A1 | 9/2002 |
| EP | 1 541 014 A1 | 12/2004 |
| WO | WO 99/62691 | * 12/1999 |

* cited by examiner

*Primary Examiner* — Yogendra Gupta
*Assistant Examiner* — Joseph Leyson
(74) *Attorney, Agent, or Firm* — Dorsey & Whitney LLP

(57) ABSTRACT

A device for producing a drip irrigation tube comprising an extrusion apparatus for extruding a tube body made from a thermoplastic synthetic material is provided. Metering elements are inserted in the extruded tube body and connected to the tube body. A calibrating device adjusts the tube body to the desired outer shape, and a cooling device cools the tube body. Outlet holes are made in the tube body in the vicinity of the metering elements to permit the passage of water from the tube body during use. A control unit for controlling the device for making outlet holes is provided, and a sensor which upon lifting of the roller during passage of a metering element emits a signal to the control unit which emits a signal to the device for making outlet holes.

14 Claims, 2 Drawing Sheets

DEVICE FOR PRODUCTION OF DRIP IRRIGATION TUBES

BACKGROUND OF THE INVENTION

1. Field of the Invention

This invention relates generally to devices for the production of drip irrigation tubes, and more particularly to devices for the production of drip irrigation tubes having metering elements.

2. Description of Related Art

Drip irrigation tubes are used for well-targeted direct irrigation of crops. These drip irrigation tubes can be designed to be on the surface in the vicinity of the plants or can be sunk into the ground. Disposed in the region of the individual plants can be one or more metering elements, by means of which it is made possible for the water to be able to escape dropwise through a bore made in the walling of the tube. In irrigation employing drip irrigation tubes of this kind, water can be used very sparingly and efficiently.

Devices for production of drip irrigation tubes are known in diverse designs. A device for production of drip irrigation tubes is shown in EP A 0 715 926, for example, in which a tube body is extruded by an extrusion apparatus. This extruded tube body is formed to the desired diameter and cooled. Pushed into the tube body are metering elements which are pressed onto the walling of the tube and are welded together therewith. The tube body provided with these metering elements arrives in a drilling device, in which the tube walling is provided with one continuous bore in each case in the vicinity of the metering elements, through which bore the water is able to escape dropwise during the irrigation process, metered by the metering element. Afterwards the drip irrigation tube thus produced can be wound up for further transport, for example on a winding device.

During manufacture of such drip irrigation tubes, the making of the outlet holes for the water by the drilling device must take place with precise positioning with respect to the corresponding metering elements. With the known device described above, the drilling of the outlet hole in the tube body is carried out after passage through the cooling devices. This means that this procedural step takes place a relatively long time after the insertion of the metering elements into the extruded tube body and the connection of these metering elements to the walling of the tube body. In particular with thick-walled tubes, the position of the respective metering element inside the tube body can be easily determined by monitoring the pressing pressure of the roller on the outside of the tube walling in the region of connection of the metering element to the walling or the evasive movement of the roller during passage of a metering element. A corresponding signal is emitted to the drilling device; the execution of the drilling takes place with time delay, however, depending upon the speed of passage of the tube body and the distance between drilling device and pressing roller, it being possible for mistakes to result, for instance owing to a change in length of the tube body as a result of higher tensile load.

Furthermore the bore is made in the completely hardened and cooled-off tube body.

BRIEF SUMMARY OF THE INVENTION

Hence the object of the present invention consists in designing a device for producing a drip irrigation tube in such a way that the bore can be positioned as precisely as possible in relation to the metering element and the drilling can be performed with as minimal energy expenditure as possible.

This object is achieved according to the invention in that the device for pressing and connecting the metering elements in the tube body is disposed in a pre-cooling chamber, a further chamber is disposed following the pre-cooling chamber, in which further chamber the drilling device is disposed, the main cooling chamber is disposed after the further chamber, and inserted between the further chamber and the main cooling chamber is the calibrating device.

With this design according to the invention, a device is obtained in which the space between the point of determination of the position of the metering elements inside the tube body by the pressing roller to the drilling device can be kept as minimal as possible. The tube body led past the drilling device is cooled only slightly in the pre-cooling chamber; during passage of this tube body through the drilling device, this tube body still has a relatively high temperature, and the hardness of the tube body material is therefore also still minimal. When using a laser drilling device for making the bore in the tube body, the energy requirement is therefore lower since in the vicinity of the laser beam the melting temperature for the material of the tube body can be reached very quickly.

Preferably, the inlet and the outlet of the pre-cooling chamber for the tube body are each provided with a seal. The escape of water from the pre-cooling chamber in the region of the inlet and the outlet is thereby kept minimal.

Preferably, a collecting vessel is disposed to collect the coolant escaping from the pre-cooling chamber through the inlet, and the further chamber is provided with a drain to drain off the coolant escaping through the outlet. The escaping coolant can thus be collected and conducted back into the circuit.

Another advantageous embodiment of the invention consists in that the pressing of the metering elements on the inner side of the walling of the tube body takes place by means of a guideway, on which the metering elements are able to be led into the tube body, and a roller able to be pressed on the outside of the tube body. The roller is thereby provided with a sensor which emits a signal to a control unit upon lifting of the roller during passage of a metering element, which control unit, for its part, emits a signal to the drilling device. Achieved thereby is a simple construction of the device.

Preferably, a suction device is disposed in the further chamber, by means of which the vapors and gases arising in the further chamber through the laser drilling can be evacuated by suction.

Preferably, a low pressure with respect to ambient pressure is applied in the main cooling chamber, whereby collapsing of the tube body in this area is prevented.

BRIEF DESCRIPTION OF THE DRAWINGS

An embodiment of the device according to the invention for producing a drip irrigation tube will be more closely explained in the following, by way of example, with reference to the attached drawing.

Shown are.

DETAILED DESCRIPTION OF THE INVENTION

Figure 1:
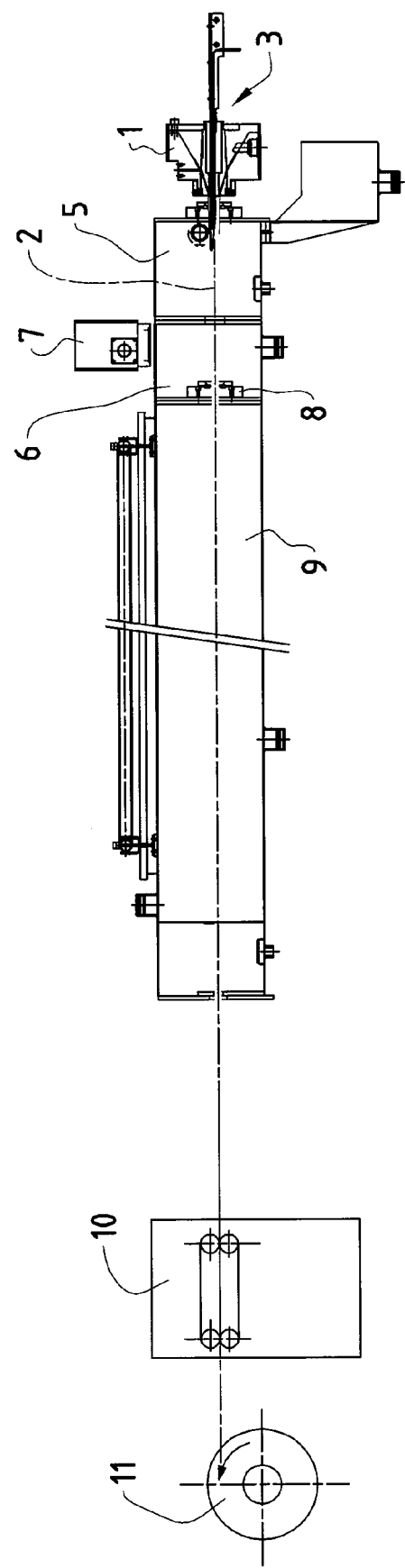
FIG. 1, in a diagrammatical representation, the device according to the invention for producing a drip irrigation tube.

FIG. 1 shows diagrammatically the construction of the device for production of drip irrigation tubes. In an extrusion apparatus 1, a tube body 2 (FIG. 2) is extruded in a known way, the material consisting of a thermoplastic synthetic material. This extrusion of the tube body takes place continuously. Via a device 3 for insertion of metering elements 4 (FIG. 2), these metering elements are introduced in a known way into the extruded tube body, where they are pressed at a constant spacing on the inner walling of the extruded tube body 2 and are connected thereto. The extruded tube body 2 with the metering elements 4 inserted therein passes through a pre-cooling chamber 5, in which the tube body is pre-cooled. Disposed after the pre-cooling chamber is a further chamber 6, in which, for its part, a drilling device 7 is disposed. In this further chamber 6, by means of the drilling device, the respective outlet hole is made in the area of the corresponding metering element.

From the further chamber 6, the tube body reaches, by way of a calibrating device 8, a main cooling chamber 9, in which the tube body is completely cooled off. Provided behind the main cooling chamber 9 is a pulling device 10, by means of which the tube body 2 is pulled out of the main cooling chamber 9 and is wound in a winding device 11 into wound rolls. The finished drip irrigation tube can then be transported to the respective place of use in the form of wound rolls.

Figure 2:
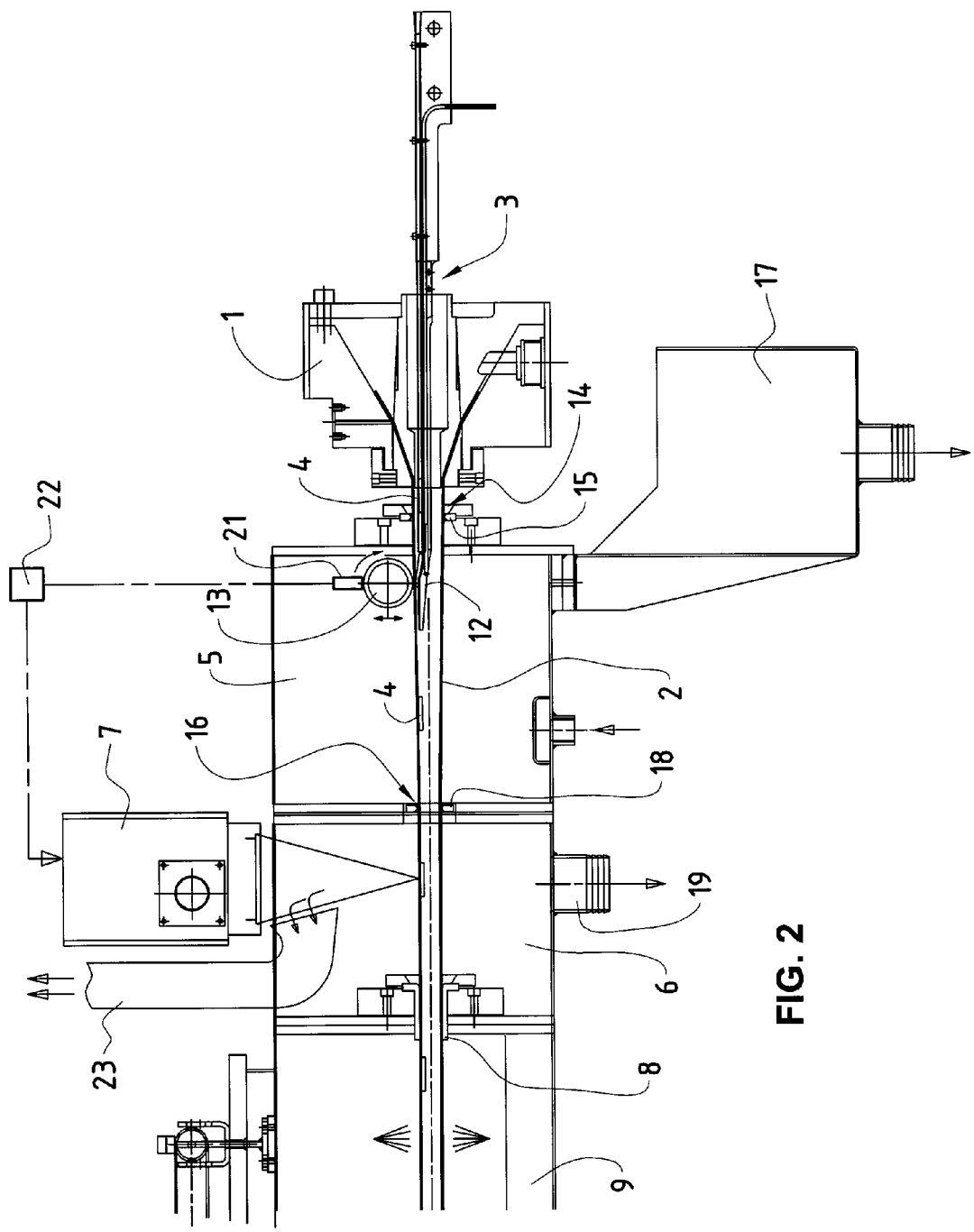
FIG. 2, in a diagrammatical representation, a sectional view through the extrusion apparatus, the pre-cooling chamber and the further chamber, in which the drilling device is disposed.

As can be seen from FIG. 2, the metering elements 4 are brought via a guideway 12 to the inner surface of the tube body 2 and are brought into contact. A roller 13, able to be pressed, is disposed in this region on the outside of the tube body 2. Between the guideway 12 and the roller 13 the metering elements 4 are pressed onto the inner surface of the walling of the tube body 2, and are welded together therewith in a known way, since the latter is still in a very soft state. The connections between metering elements 4 and the tube body 2, achieved by means of the guideway 12 and the roller 13, take place inside the pre-cooling chamber 5. The inlet 14, through which the tube body 2 arrives in the pre-cooling chamber 5 after the extrusion step, is sealed off with a lip seal 15.

Introduced into the pre-cooling chamber 5 in a known way is a coolant, which consists here of water in this embodiment, it being possible for this water to be introduced by flooding or spraying into the pre-cooling chamber 5, depending upon the desired cooling capacity. Any water escaping through the inlet 14 is collected by a collecting vessel 17. The water collected here can be conducted in a known way into the circuit again of the device for production of drip irrigation tubes.

After passing through the pre-cooling chamber 5, the tube body 2, with the inserted metering elements 4, arrives in a further chamber 6 via the outlet 16, which further chamber is disposed after the pre-cooling chamber 5. The outlet 16 is likewise sealed off with a lip seal 18, in order to keep the quantity of water reaching the further chamber 6 from the pre-cooling chamber 5 as minimal as possible. The water which nevertheless ends up in the further chamber 6 is likewise conducted into the cooling circuit again via the drain 19.

After passage through the further chamber 6, by way of a calibrating device 20, in which the tube body is adjusted to the precise outer contour, the tube body reaches the main cooling chamber 9, in which the tube body 2 is completely cooled down, and is subsequently rolled up, as can be seen from FIG. 1.

Disposed in the further chamber 6 is the drilling device 7. This drilling device 7 is designed in a known way as laser drilling device. The outlet holes are bored in a known way in the tube body with this laser drilling device 7. These outlet holes are located in precisely positioned location in relation to the metering elements 4.

In order to be able to make the outlet holes in exactly the right place in the tube body 2, the roller 13, able to be pressed on, is provided with a sensor 21. During the passage of a metering element 4 between the guideway 12, which is disposed in a fixed way, and the roller 13, situated opposite, and able to be pressed on, the roller 13 is lifted slightly against the pressing force, which is detected by the sensor 21, and which leads to the emission of a signal to a control device 22. The control device 22 activates, via a signal, the drilling device 7, in order to emit a laser beam, whereby this signal is delayed by the time a metering element takes to cover the way from the roller 13 to the point of drilling operation. It is thereby ensured that the drilling step is carried out at exactly the right position with respect to the metering element 4 in the tube body 2. The distance between the roller 13 and the point of drilling operation is very minimal. Practically no changes in length of the tube body take place in this segment; the precision in making the bore hole at the right place in the tube body 2 is ensured.

In the pre-cooling chamber 5, the extruded tube body 2 is cooled by a minimal amount. The cooling should only be just sufficient for the transit of the tube body to take place correctly out of the pre-cooling chamber 5 through the further chamber 6 into the main cooling chamber 9. In the region of the further chamber 6, where the bore is made in tube body 2, the tube body 2 still has a temperature which is just a little below the melting temperature of the respective material. During the drilling procedure by the laser drilling device, the material of the tube body is melted. Since, for the reasons described in the foregoing, the melting point can be reached very quickly, a laser beam with minimal energy can be emitted, whereby a savings in energy results.

Used in the further chamber 6 is a suction device 23, by means of which the vapors and gases arising in the further chamber 6 during the drilling procedure can be evacuated by suction.

The lip seals 15 and 18 at the inlet 14 or respectively outlet 16 of the pre-cooling chamber 5 are designed so soft that they have as a consequence no deformation of the tube body 2 passing through and no change in the surface of the tube body 2.

In a known way, a low pressure with respect to the ambient pressure is applied in the main cooling chamber 9. The tube body 2 is thereby prevented from being able to collapse inside the main cooling chamber 9 owing to the pressure of the coolant. Through this low pressure, air escapes through the outlet hole in the vicinity of the metering elements; the amount of air escaping here is very minimal owing to the metering elements, and consequently has no influence on the keeping of the shape of the tube body 2.

With this device according to the invention for producing a drip irrigation tube, the drilling operations for making the outlet holes are carried out in exactly the right place in the tube body. By disposing the drilling device before the main cooling chamber, i.e. before the tube body is completely cooled off, a corresponding savings in energy for the drilling procedure can also be achieved.

The invention claimed is:

1. A device for producing a drip irrigation tube, comprising an extrusion apparatus for extrusion of a tube body made of a thermoplastic synthetic material, a device for inserting metering elements in the extruded tube body, a roller for pressing and connecting the metering elements in the tube body, calibrating devices for adjusting the extruded tube body to the desired outer shape, cooling devices for cooling of the extruded tube body with coolant, and a drilling device for making outlet holes in the vicinity of the metering elements for permitting the passage of water, wherein the roller is disposed in a pre-cooling chamber and is provided with a sensor which upon lifting of the roller during passage of a metering element emits a signal to a control unit which emits a signal to the drilling device, and wherein a further chamber is disposed following the pre-cooling chamber, the drilling device is disposed in the further chamber, a main cooling chamber is disposed after the further chamber, and the calibrating device is inserted between the further chamber and the main cooling chamber.

2. The device according to claim 1, wherein the pre-cooling chamber has an inlet and the outlet and a seal is provided at each of the inlet and the outlet.

3. The device according to claim 2, further comprising a collecting vessel for collecting coolant escaping through the inlet from the pre-cooling chamber, and wherein the further chamber is provided with a drain to drain off coolant escaping through the outlet.

4. The device according to claim 1, further comprising a guideway for leading the metering elements into the tube body and for pressing the metering elements on the inner side of the walling of the tube body and wherein the roller can be pressed on the outside of the tube body.

5. The device according to claim 1, wherein the drilling device is a laser drilling device.

6. The device according to claim 5, further comprising a suction device disposed in the further chamber.

7. The device according to claim 1, wherein the main cooling chamber has a low pressure relative to ambient pressure.

8. A device for producing a drip irrigation tube from a thermoplastic synthetic material, comprising an extrusion apparatus for extruding a tube body made from the thermoplastic synthetic material, a device for inserting metering elements in the extruded tube body, a roller for pressing and connecting the metering elements to the tube body, a cooling device for cooling the tube body, a device for making outlet holes in the tube body in the vicinity of the metering elements to permit the passage of water from the tube body during use, a control unit for controlling the device for making outlet holes, and a sensor which upon lifting of the roller during passage of a metering element emits a signal to the control unit which emits a signal to the device for making outlet holes.

9. The device according to claim 8, further comprising a calibrating device for adjusting the tube body to the desired outer shape.

10. The device according to claim 8, further comprising a pre-cooling chamber, the roller being disposed in the pre-cooling chamber.

11. The device according to claim 10, further comprising a further chamber disposed after the pre-cooling chamber, the device for making outlet holes in the tube body being disposed in the further chamber.

12. The device according to claim 11, further comprising a main cooling chamber disposed after the further chamber, a calibrating device for adjusting the tube body to the desired outer shape being located between the farther chamber and the main cooling chamber.

13. The device according to claim 8, wherein the roller is provided with the sensor.

14. The device according to claim 8, further comprising a guideway for leading the metering elements into the tube body and for pressing the metering elements on the inside of the tube body and wherein the roller can be pressed on the outside of the tube body.

* * * * *